US012771130B2

(12) United States Patent
Liang

(10) Patent No.: US 12,771,130 B2
(45) Date of Patent: Oct. 20, 2026

(54) HEAVY OVERLOAD CHECK METHOD FOR LOAD TRANSFER DECISION OF OPEN-LOOP POWER GRID

(71) Applicant: JIANGMEN POWER SUPPLY BUREAU OF GUANGDONG POWER GRID CO., LTD, Jiangmen (CN)

(72) Inventor: Guangyu Liang, Jiangmen (CN)

(73) Assignee: JIANGMEN POWER SUPPLY BUREAU OF GUANGDONG POWER GRID CO., LTD, Guangdong (CN)

( * ) Notice: Subject to any disclaimer, the term of this patent is extended or adjusted under 35 U.S.C. 154(b) by 869 days.

(21) Appl. No.: 18/022,937

(22) PCT Filed: Sep. 16, 2020

(86) PCT No.: PCT/CN2020/115552
§ 371 (c)(1),
(2) Date: Feb. 23, 2023

(87) PCT Pub. No.: WO2022/052146
PCT Pub. Date: Mar. 17, 2022

(65) Prior Publication Data

US 2023/0318291 A1 Oct. 5, 2023

(30) Foreign Application Priority Data

Sep. 8, 2020 (CN) ......................... 202010934704.1

(51) Int. Cl.
*H02J 3/0012* (2026.01)
*H02J 3/00* (2026.01)
(Continued)

(52) U.S. Cl.
CPC ............... *H02J 3/0012* (2020.01); *H02J 3/00* (2013.01); *H02J 2103/30* (2026.01); *H02J 2103/35* (2026.01)

(58) Field of Classification Search
CPC ........ H02J 3/0012; H02J 3/00; H02J 2203/10; H02J 2203/20
See application file for complete search history.

(56) References Cited

U.S. PATENT DOCUMENTS 7,844,438 B1 * 11/2010 Verghese ................ G06F 30/33 703/14
8,756,556 B1 * 6/2014 Raghunathan .......... G06F 17/11 716/120
(Continued)

FOREIGN PATENT DOCUMENTS

CN 102999784 A 3/2013
CN 105470949 A 4/2016
(Continued)

OTHER PUBLICATIONS

International Search Report for PCT/CN2020/115552 mailed Jun. 3, 2021, ISA/CN.

*Primary Examiner* — Eman A Alkafawi
*Assistant Examiner* — Joseph O Nyamogo
(74) *Attorney, Agent, or Firm* — Yue (Robert) Xu; Apex Attorneys at Law, LLP

(57) ABSTRACT

Provided is a method for detecting overloading of devices for load transfer in an open-loop power grid, including: constructing a power supply tree graph; determining a target device and a standby power supply; determining a target node, a target set, and one or more target subsets; for each of the target subsets, determining nodes in said target subset between which the parent-child relationship is reversed due to the load transfer, and performing overload detection on each device corresponding to one of the nodes or an edge on
(Continued)

a path connecting the nodes; and determining two nodes between which a direct parent-child relationship is generated from nonexistence due to the load transfer, and performing overload detection on each device corresponding to a node or an edge on a path connecting a parent node of the two nodes and a common parent node.

10 Claims, 6 Drawing Sheets

(51) Int. Cl.
*H02J 103/30* (2026.01)
*H02J 103/35* (2026.01)

(56) References Cited

U.S. PATENT DOCUMENTS

| | | | | |
|---|---|---|---|---|
| 10,198,018 | B2 * | 2/2019 | Gan | G05B 15/02 |
| 2012/0195205 | A1 * | 8/2012 | Retana | H04W 40/246 370/254 |
| 2014/0249688 | A1 * | 9/2014 | Ansari | G05F 1/66 700/297 |
| 2015/0244171 | A1 * | 8/2015 | Bartlett | H02J 4/00 307/29 |
| 2017/0346290 | A1 * | 11/2017 | Manson | H02J 3/381 |
| 2020/0212710 | A1 * | 7/2020 | Gu | H02J 3/381 |
| 2021/0075254 | A1 * | 3/2021 | Champaneri | H02J 13/10 |

FOREIGN PATENT DOCUMENTS

| | | | |
|---|---|---|---|
| CN | 110263078 | A | 9/2019 |
| CN | 110850199 | A | 2/2020 |
| CN | 111126841 | A | 5/2020 |
| KR | 20150021847 | A | 3/2015 |

* cited by examiner

HEAVY OVERLOAD CHECK METHOD FOR LOAD TRANSFER DECISION OF OPEN-LOOP POWER GRID

CROSS REFERENCE OF RELATED APPLICATION

This application is the national phase of International Application No. PCT/CN2020/115552, titled "HEAVY OVERLOAD CHECK METHOD FOR LOAD TRANSFER DECISION OF OPEN-LOOP POWER GRID", filed on Sep. 16, 2020, which claims priority to Chinese Patent Application No. 202010934704.1, titled "HEAVY OVERLOAD CHECK METHOD FOR LOAD TRANSFER DECISION OF OPEN-LOOP POWER GRID", filed on Sep. 8, 2020 with the China National Intellectual Property Administration, both of which are incorporated herein by reference in their entireties.

FIELD

The present disclosure relates to the technical field of power systems, and in particular to a method for detecting overloading of devices for load transfer in an open-loop power grid.

BACKGROUND

A high voltage distribution network and a medium/low voltage distribution network generally operate in an open-loop state. Path analysis is important for load transfer in an open-loop power grid. Most of conventional methods for detecting overloading of a device are performed based on power flow convergence.

A Chinese patent publication No. CN106849098B discloses a method for calculating a power flow of a power system, which has low computational complexity and may improve efficiency in calculating the power flow of the power system.

However, the above-mentioned method proposes an idea only for performing power superposition not involving voltages based on a wide area topology model of a radiant-type power grid with all voltages, all paths, and all devices, and no application scenario of such power flow calculation is specifically proposed.

SUMMARY

An objective of the present disclosure is to overcome deficiencies of a conventional technology, and provide a method for detecting overloading of devices for load transfer in an open-loop power grid. With the method, a load transfer scheme for an open-loop power grid can be determined by using fast power flow superposition, such that a load transfer scheme that meets certain condition may be determined and thereby both device isolation and load transfer may be realized.

In order to solve the above-mentioned technical problems, the following technical solutions are proposed in the present disclosure.

A method for detecting overloading of devices for load transfer in an open-loop power grid is provided. The method includes:

S1, acquiring attribute information and connection information of each device in a power station based on global naming of devices in a power system, and constructing a power supply tree graph corresponding to the power grid;

S2, determining a target device and a standby power supply used for the target device, wherein the target device is an abnormal device in the power system, and not performing overload detection on each device not directly related to the target device or the standby power supply;

S3, determining a node in the power supply tree graph corresponding to the target device; determining subgraph in downstream of the node in the power supply tree graph as a target set; and dividing the target set into multiple target subsets, based on connection relationship among nodes in the target set;

S4, for each of the target subsets, determining whether there are two nodes between which a parent-child relationship is changed due to the load transfer; performing step S5 on a target subset in response to there being the two nodes between which the parent-child relationship is changed due to the load transfer, and not performing overload detection on each device corresponding to a node or an edge on a path connecting nodes in said target subset in response to there being no two nodes between which the parent-child relationship is changed due to the load transfer;

S5, determining whether each parent-child relationship among nodes in said target subset exists before the load transfer, performing step S6 in response to a parent-child relationship among nodes in said target subset existing before the load transfer, and performing step S7 in response to a parent-child relationship among nodes in said target subset not existing before the load transfer;

S6, determining nodes in said target subset between which the parent-child relationship is reversed, and performing overload detection on each device corresponding to one of the nodes or an edge on a path connecting the nodes, and not performing overload detection on each device corresponding to a node or an edge in said target subset other than the nodes or the edge on a path connecting the nodes; and S7, determining nodes in said target subset between which a direct parent-child relationship is generated from nonexistence due to the load transfer; for a parent side, performing overload detection on each device corresponding to a node or an edge on a path connecting a parent node of the two nodes and a common parent node; for a child side, determining whether the parent-child relationship among the child node of the two nodes and all nodes in downstream of the child node is reversed, performing overload detection on each device corresponding to one of nodes having the reversed parent-child relationship or an edge on a path connecting the nodes having the reversed parent-child relationship, and not performing overload detection on each device corresponding to a node or an edge in said target subset other than the nodes having the reversed parent-child relationship or the edge on a path connecting the nodes having the reversed parent-child relationship.

According to the present disclosure, a method for detecting overloading of devices for load transfer in an open-loop power grid is provided. Load transfer is generally triggered by an abnormal device, that is, a state after load transfer indicates that a certain device is in an abnormal operation, such as maintenance, overloading and tripping. The abnormal device may have an impact on at least a part of devices in the power grid. The impacted devices and real-time operation modes thereof are determined through various methods. An operation mode mainly includes a real-time path and a real-time power distribution, and thus a transfer analysis includes a path analysis and a power distribution analysis. After the transfer analysis is completed, a new path should be verified for safety and stability, that is, the new path should be detected for occurrence of overloading. By detecting for occurrence of overloading, both device isolation and load transfer may be achieved. When performing overload detection, it is necessary to perform calculation on the impacted devices, rather than the entire power grid. Therefore, it is important to determine devices in the power grid which are impacted due to the abnormal device.

In a further embodiment, step S1 further includes: simplifying the power supply tree graph.

In a further embodiment, the simplifying the power-supply tree graph includes: omitting each transition node and each islanding node from the power-supply tree graph.

In a further embodiment, the transition node is a node connected to two edges, and the islanding node is a node not connected to any edge.

In a further embodiment, step S2 specifically includes:

- S21, determining a target device and a standby power supply used for the target device, wherein the target device is an abnormal device in the power system;
- S22, determining, in the power supply tree graph, a node corresponding to the target device and an edge corresponding to the standby power supply, and determining a common parent node shared by the node and the edge; and
- S23, not performing overload detection on each device corresponding to a node or an edge that is not on a path connecting the common parent node and the edge corresponding to the standby power supply.

In a further embodiment, in step S1 to step S7, the overload detection is performed through power superposition.

In a further embodiment, the power superposition specifically includes:

- (i) calculating a net output power or net input power of a device corresponding to a node in the power supply tree graph along a power flow direction from a power supply side to a load side, and comparing the net output power or net input power with a rated transmission power of the device to determine whether the device is overloaded; and
- (ii) calculating a sum of loads superposed on a device corresponding to an edge in the power supply tree graph along a power transmission direction, and comparing the sum with a tolerant capacity of the device to determine whether the device is overloaded.

In a further embodiment, in step (i), each node in the power supply tree graph represents a device which is not capable of being switched between on and off in the power system.

In a further embodiment, in step (ii), each edge in the power supply tree graph represents a device which is capable of being switched between on and off in the power system.

In a further embodiment, after step S7, the method further comprises: determining an order of all devices subject to the overload detection based on an actual load rate after the load transfer.

Compared with the conventional technology, the advantageous effects of the present disclosure are as follows. A process of detecting overloading of devices and prioritizing transfer schemes is performed on a computer according to above-mentioned steps, without manual operation by dispatching personnel. Therefore, an efficiency of power grid dispatching is improved, labor intensity of the dispatching personnel is reduced, and a full-automatic adaptation of a power distribution network to an abnormal device is realized.

DETAILED DESCRIPTION OF EMBODIMENTS

Figure 1:
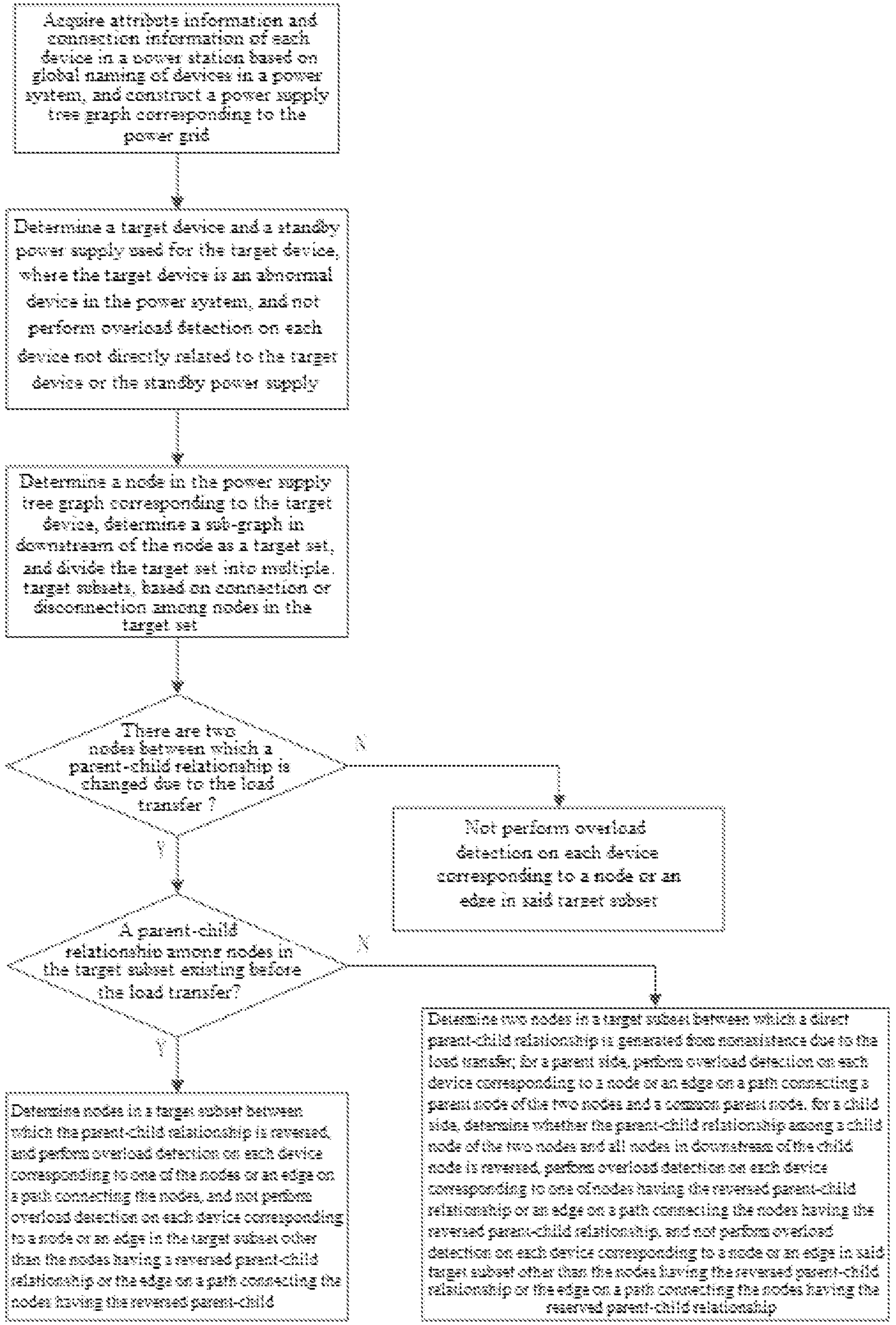
FIG. 1 is a flowchart of a method for detecting overloading of devices for load transfer in an open-loop power grid according to the present disclosure.

The present disclosure is further described hereinafter in conjunction with specific embodiments. The drawings are only used for exemplary description, and are only schematic diagrams rather than physical diagrams, and should not be understood as a limitation to the present disclosure. In order to better illustrate the embodiments of the present disclosure, some of components in the drawings may be omitted, enlarged or reduced, which does not represent an actual size of a product. It should be understood by those skilled in the art that some well-known structures and descriptions of the structures may be omitted in the drawings.

The same or similar reference numerals in the drawings of the embodiments of the present disclosure indicate the same or similar components. It should be understood that in the description of the present disclosure, orientations or position relationships, indicated by terms "upper", "lower", "left", "right", and the like, are shown based on the drawings. These terms are used for the convenience of describing the present disclosure and simplifying the description, rather than indicating or implying that devices or elements indicated by the terms must have the designated orientation, or be constructed and operated in the designated orientation. Therefore, the terms describing a position relationship in the drawings are used only for exemplary description, and should not be understood as a limitation to the present disclosure. Those skilled in the art may understand the meanings of the terms in a certain condition.

Embodiment 1

FIG. 1 to FIG. 6 show a method for detecting overloading of devices for load transfer in an open-loop power grid according to a first embodiment of the present disclosure. The method includes steps S1 to S7.

In step S1, attribute information and connection information of each device in a power station are acquired based on global naming of devices in a power system, and a power supply tree graph corresponding to the power grid is constructed and simplified.

The tree graph is simplified by omitting each transition node and each islanding node from the power supply tree graph. It should be noted that, the power supply tree graph includes four types of nodes, i.e., end node, transition node, distribution node and islanding node. The end node is connected to one edge, the transition node is connected to two edges, the distribution node is connected to three or more edges, and the islanding node is not connected to any edge. The transition node is omitted because that the transition node has no impact on determining a rule for overload detection. The islanding node is omitted because that the islanding node has no research significance.

In step S2, an abnormal device in the power system is determined as a target device, and a standby power supply used for the target device is determined; and overloading detection is not performed on each device not directly related to the target device or the standby power supply.

The step S2 specifically includes steps S21 to S23.

In step S21, an abnormal device in the power system is determined as a target device, and a standby power supply used for the target device is determined.

In step S22, a node corresponding to the target device and an edge corresponding to the standby power supply are determined in the power supply tree graph, and a common parent node shared by the node and the edge is determined. It should be noted that different standby edges share different common parent nodes with the target node.

In step S23, overload detection is not performed on each device corresponding to a node or an edge that is not on a path connecting the common parent node and the edge corresponding to the standby power supply.

In step S3, a node corresponding to the target device is determined in the power supply tree graph, a sub-graph in downstream of the node is determined as a target set, and the target set is divided into multiple target subsets based on connection relationship among nodes in the target set.

Step S3 specifically includes steps S31 to S32.

In step S31, a node corresponding to the target device is determined in the power supply tree graph; the target set [Q], which is a set in downstream of the node, is determined; and a standby edge connected to the target set [Q] is determined.

In step S32, the target set is divided into multiple target subsets based on connection relationship among nodes in the target set, and the multiple target subsets are denoted as [Q1], [Q2], . . . , [Qn]. That is, nodes in a same one of the target subsets are connected to each other, and nodes located in different ones of the target subsets are not connected to each other.

In step S4, it is determined, for each of the target subsets, whether there are two nodes between which a parent-child relationship is changed due to the load transfer. Step S5 is performed on a target subset in response to there being the two nodes between which a parent-child relationship is changed due to the load transfer; and overload detection is not performed on each device corresponding to a node or an edge on a path connecting nodes in said target subset in response to there being no two nodes between which the parent-child relationship is changed due to the load transfer.

In step S5, it is determined whether each parent-child relationship among nodes in said target subset exists before the load transfer, step S6 is performed in response to a parent-child relationship among nodes in said target subset existing before the load transfer, and step 7 is performed in response to a parent-child relationship among nodes in said target subset not existing before the load transfer.

In step S6, nodes in said target subset between which the parent-child relationship is reversed are determined, and overload detection is performed on each device corresponding to one of the nodes or an edge on a path connecting the nodes, and the overload detection is not performed on each device corresponding to a node or an edge in said target subset other than the nodes or the edge on a path connecting the nodes.

In step S7, nodes in said target subset between which a direct parent-child relationship is generated from nonexistence due to the load transfer are determined; for a parent side, overload detection is performed on each device corresponding to a node or an edge on a path connecting a parent node of the two nodes and a common parent node; and for a child side, it is determined whether the parent-child relationship among a child node of the two nodes and all nodes in downstream of the child node is reversed, and the overload detection is performed on each device corresponding to one of nodes having a reversed parent-child relationship or an edge on a path connecting the nodes having the reversed parent-child relationship, and the overload detection is not performed on each device corresponding to a node or an edge in said target subset other than the nodes having the reversed parent-child relationship or the edge on a path connecting the nodes having the reversed parent-child relationship.

Figure 2:
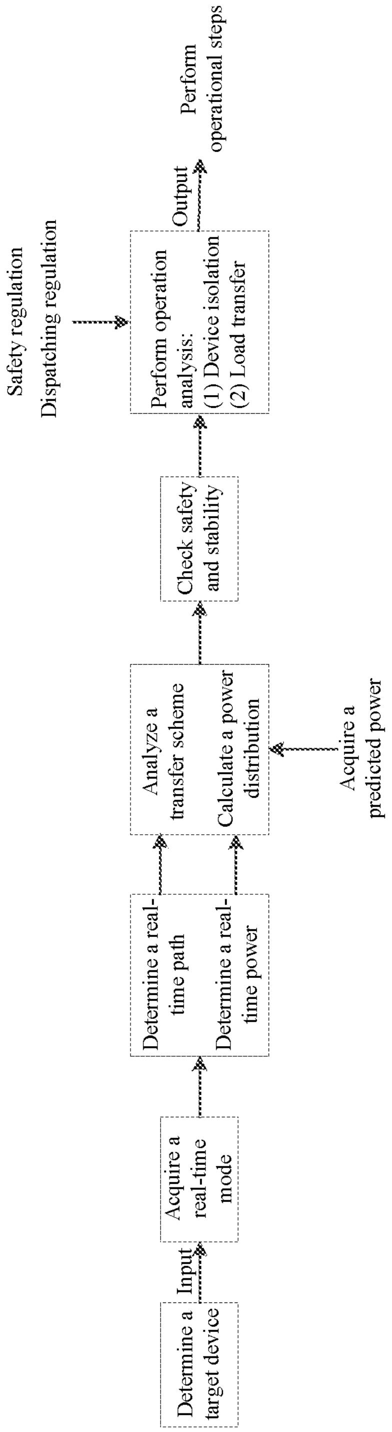
FIG. 2 is a flowchart of a process of determining a load transfer scheme according to the present disclosure.

As shown in FIG. 2, a load transfer is generally triggered due to an abnormal operation of a device, such as maintenance, overloading or tripping. Therefore, such device may be defined as a target device. The abnormal operation of the target device has an impact on a part of devices in the power grid. The impacted devices and real-time operation modes thereof are determined through various methods. An operation mode mainly includes a real-time path and a real-time power distribution, and thus a transfer analysis includes a path analysis and a power distribution analysis. After the transfer analysis is completed, a new path should be verified for safety and stability, that is, the new path should be detected for occurrence of overloading. By detecting for occurrence of overloading, both device isolation and load transfer may be achieved. In a process of transferring load in an open-loop distribution network, a transfer scheme is acceptable as long as devices are not overloaded. Therefore, it is required to determine whether a terminal voltage meets a requirement only when supply power via ultra-long power lines in a power distribution network. In most cases, calculation for load transfer does not involve voltage.

Figure 3:
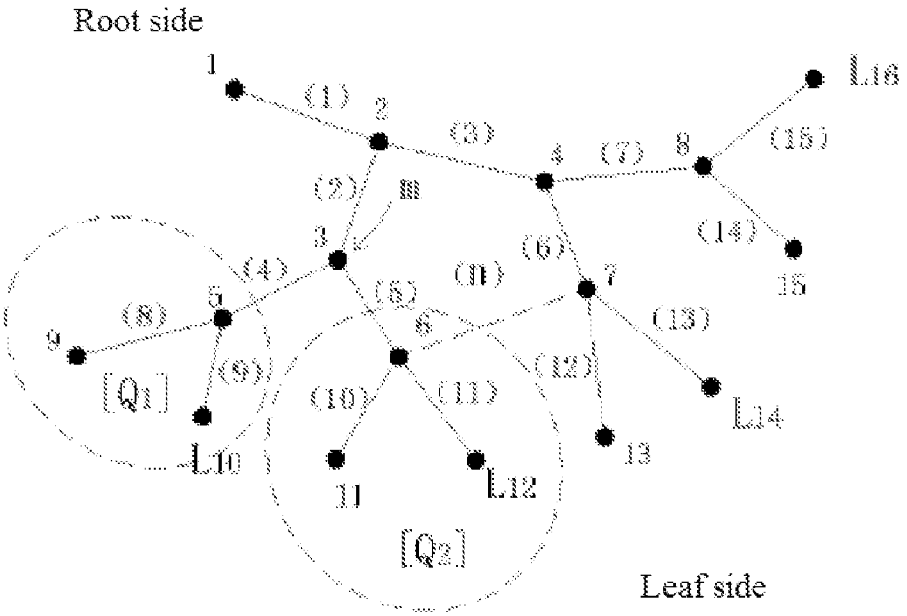
FIG. 3 is a first example illustrating the method for detecting overloading of devices for load transfer in an open-loop power grid according to the present disclosure.

As shown in FIG. 3, when a target device corresponds to node 3 and a standby power supply corresponds to edge (n), a common parent node shared by node 3 and edge (n) is node 2. In this case, overload detection is required to be performed on devices corresponding to edge (3), node 4, edge (6), node 7, and edge (n) in the power supply tree graph. Devices other than the above-mentioned devices are not affected in terms of power transmission, and therefore are not subject to overload detection. In a case that a parent-child relationship of nodes in the target set [Q2] is not changed, or in a case that a power direction in the target set [Q2] is not changed due to the load transfer, overload detection is not performed on the target set [Q2].

Figure 4:
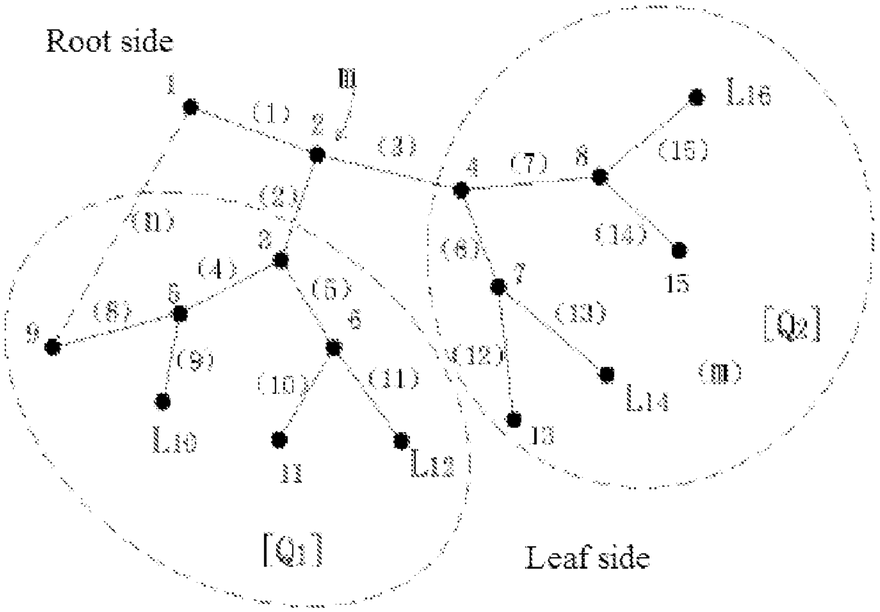
FIG. 4 is a second example illustrating the method for detecting overloading of devices for load transfer in an open-loop power grid according to the present disclosure.

As shown in FIG. 4, when a target device is node 2 and a standby power supply used is edge (n), a common parent node shared by node 2 and edge (n) is node 1. Since a parent-child relationship among node 3, node 5, and node 9 in the target set [Q1] is reversed due to load transfer, it is required to perform overload detection. For such transfer scheme, overload detection is required to be performed on devices corresponding to edge (n), node 9, edge (8), node 5, edge (4), and node 3 in the power supply tree graph. Reversal of a parent-child relationship includes the following situations:

I) a node changing from a highest-level parent node to a lowest-level child node;

II) a node changing from a lowest-level child node to a highest-level parent node;

III) a node changing from a non-highest-level parent node to a non-lowest-level child node; and IV) a node changing from a non-lowest-level child node to a non-highest-level parent node.

In practice, a node is subject to the overload detection only if the node belongs to one of cases II), III), and IV). Since node 3 is changed from a highest-level parent node to a lowest-level child node among node 3, node 5, and node 9, the overload detection may or may not be performed on node 3.

Figure 5:
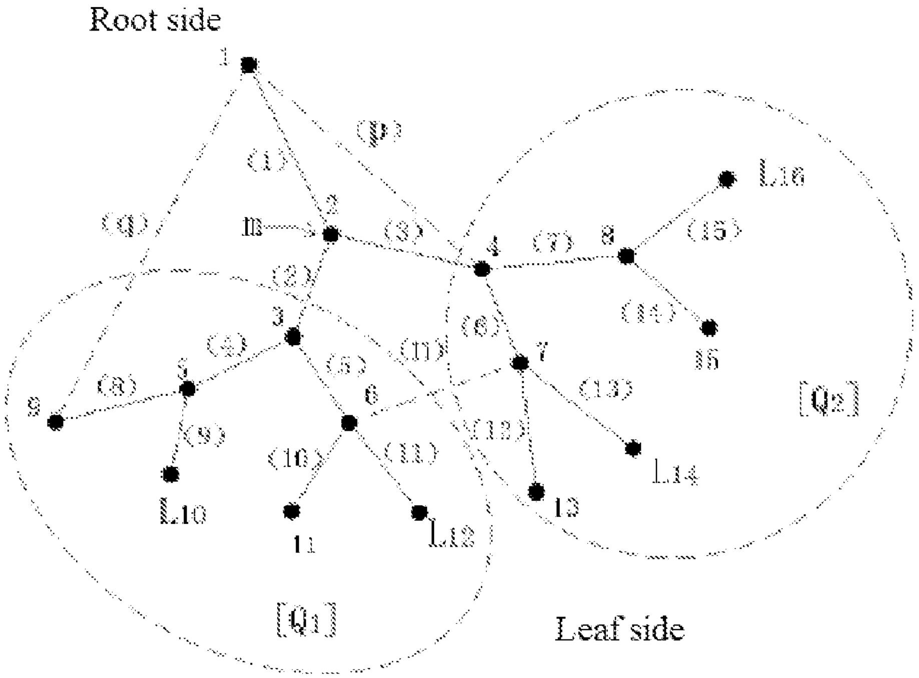
FIG. 5 is a third example illustrating the method for detecting overloading of devices for load transfer in an open-loop power grid according to the present disclosure.

As shown in FIG. 5, node 2 is a target device. In a case that a load transfer scheme of [Q1]+[Q2]−(p)(q)(n)/(4) is adopted, overload detection is to be performed on devices corresponding to edge (q), node 9, edge (8), edge (p), node 4, edge (6), node 7, edge (n), node 6, and edge (5).

In step S1 to step S7, the overload detection is performed through power superposition.

The power superposition specifically includes the following steps (i) to (ii).

In step (i), a net output power or net input power of a device corresponding to a node in the power supply tree graph is calculated, along a power flow direction from a power supply side to a load side, and the net output power or net input power is compared with a rated transmission power of the device to determine whether the device is overloaded.

A node in the power supply tree graph corresponds to a device that is not capable of being switched between on and off in the power system.

In step (ii), a sum of loads superposed on a device corresponding to an edge in the power supply tree graph is calculated, along a power transmission direction, and the sum is compared with a tolerant capacity of the device to determine whether the device is overloaded.

Each edge in the power supply tree graph corresponds to a device that is capable of being switched between on and off.

As shown in FIG. 3, node 1, node 9, node L10, node 11, node L12, node 13, node L14, node 15, and node L16 are end nodes; and node 2, node 3, node 4, node 5, node 6, node 7, and node 8 are distribution nodes.

Each end node, which is connected to only one edge, may further be divided into three categories, i.e., a root node, a leaf node, and a tail node. Node 1 in FIG. 3 is the root node. The leaf node carries a load on itself, such as node L10, node L12, node L14, and node L16 in FIG. 3. The tail node carries no load, such as node 9, node 11, node 13, and node 15 in FIG. 3. Therefore, the power supply tree graph includes, along the power flow direction from the power supply side to the load side, a root node, a distribution node, a transition node, a tail node, and a leaf node.

It should be noted that each node represents a device on a power supply path, and the device is not capable of being switched between on and off, and cannot be distinguished from another by a voltage level or a device attribute. The device not capable of being switched between on and off includes a power line, a bus, a connecting line, or the like.

Since the device may be connected to multiple edges, it is necessary to calculate a net output power or a net input power of the device when performing the overload detection on the device. According to the KCL law, the net output power and the net input power of a node-type device are equal to each other. Therefore, either an input side or an output side of the node-type device may be taken for calculation. As shown in FIG. 3, a net output of node 7 is a sum of loads on node L12 and node L14, and the net output of node 4 is a sum of loads on node L12, node L14, and node L16. As shown in FIG. 4, the net output of node 9 is a sum of loads on node L10 and node L12, and the net output of node 5 is also a sum of loads on node L10 and node L12. By comparing a net output power of a node-type device with a rated transmission power of the device, it may be determined whether the device is overloaded, and in turn whether a transfer scheme is acceptable.

Figure 6:
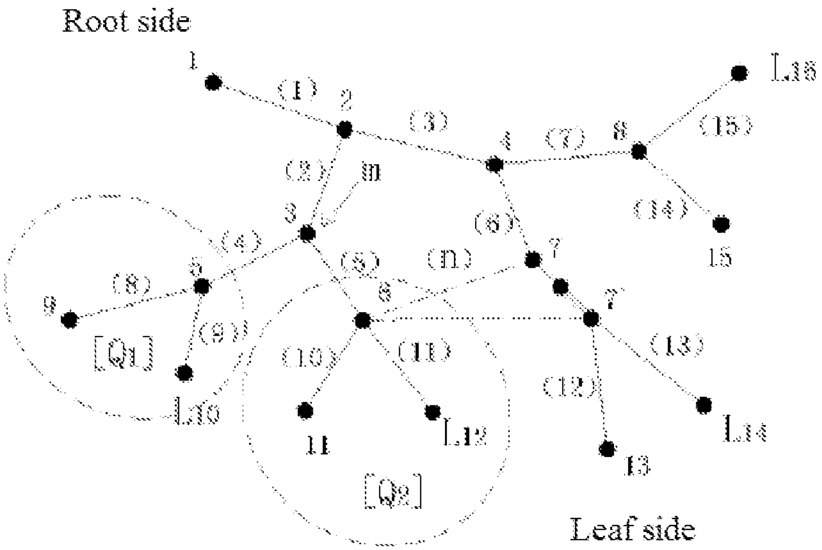
FIG. 6 is a fourth example illustrating the method for detecting overloading of devices for load transfer in an open-loop power grid according to the present disclosure.

In a normal circumstance, the rated transmission power of the device may be determined based on a material and a cross-sectional area of the device. For example, the node device may be a bus, a high-voltage transmission line, a short connection line, or other devices. However, the cross-sectional area of a line, such as a medium/low voltage distribution line, may be inconsistent along an extension direction. In this case, the rated transmission power of the line is determined based on a path that a load actually passes through. As shown in FIG. 6, it is assumed that node 7 is a medium/low voltage distribution line, and a diameter at an upstream position of the line is smaller than a diameter at a downstream position of the line. Node 7 would not be overloaded when edge (n) is connected to position 7, but would be overloaded when edge (n) is connected to position 7'.

Embodiment 2

Embodiment 2 is similar to Embodiment 1, except that the method according to Embodiment 2 further includes step 8 after step S7. In step S8, an order of all devices subject to the overload detection is determined based on an actual load rate after the load transfer. The order may be an ascending order or a descending order. It should be noted that the actual load rate is a ratio of an actual load of the device after load transfer to a rated load of the device.

As shown in FIG. 5, node 2 is the target device. It is assumed that the transfer schemes which are determined would not cause overloading of a device are listed in a sequence as follows:

1. $[Q1] \to (q);[Q2] \to (p)$
2. $[Q1] + [Q2] \to (p)(q)(n)/(6)$
3. $[Q1] + [Q2] \to (p)(q)(n)/(5)$
4. $[Q1] + [Q2] \to (p)(q)(n)/(4)$
5. $[Q1] + [Q2] \to (p)(q)(n)/(8)$

For each of the transfer schemes, the devices required to be subject to overload detection and load rates thereof are as follows:

1. (q), 9, (8), 5, (4); (p); a maximum load rate of the devices is 80%, and a minimum load rate of the devices is 20%.

2. (q), 9, (8), 5, (4), 3, (5), 6, (n); (p); a maximum load rate of the devices is 60%, and a minimum load rate of the deices is 20%.
3. (q), 9, (8), 5, (4); (p), 4, (6), 7, (n); a maximum load rate of the devices is 60%, and a minimum load rate of the devices is 30%.
4. (q), 9, (8); (p), 4, (6), 7, (n), 6, (5); a maximum load rate of the devices is 80%, and a minimum load rate of the devices is 30%.
5. (q); (p), 4, (6), 7, (n), 6, (5); a maximum load rate of the devices is 50%, and a minimum load rate of the devices is 30%.

Based on the above, a sequence determined based on the overload detection is: 5, 3, 2, 4, 1.

The above embodiments of the present disclosure are merely examples provided for a purpose of a clear illustration of the present disclosure, and are not intended to limit an implementation of the present disclosure. For those of ordinary skill in the art, other changes or modifications in different forms may be made on the basis of the above description. It is unnecessary and impossible to list all the implementations here. Any modification, equivalent substitution, or improvement made within the spirit and the principle of the present disclosure shall fall within the protection scope of the claims of the present disclosure.

The invention claimed is:

1. A method for detecting overloading of devices for load transfer in an open-loop power grid, comprising:

constructing, based on attribute information and connection relationship of devices in the power grid, a power supply tree graph corresponding to power transmission in the power grid information;

determining a target device and a standby power supply adopted for the load transfer, wherein the target device is an abnormal device in the power system;

determining a node in the power supply tree graph corresponding to the target device;

determining a sub-graph in downstream of the node as a target set; and dividing the target set into one or more target subsets, based on connection relationship among nodes in the target set before the load transfer;

for each of the target subsets, connecting subset determining nodes in said target subset between which the parent-child relationship is reversed due to the load transfer, and performing overload detection on each device corresponding to one of the nodes or an edge on a path connecting the nodes, and determining two nodes between which a direct parent-child relationship is generated from nonexistence due to the load transfer, and performing overload detection on each device corresponding to a node or an edge on a path connecting a parent node of the two nodes and a common parent node.

2. The method according to claim 1, further comprising: simplifying the power supply tree graph.

3. The method according to claim 2, wherein the simplifying the power supply tree graph comprises:

removing each islanding node from the power supply tree graph, and replacing each transition node and all edges connected to the transition node with one edge.

4. The method according to claim 3, wherein the transition node is a node connected to merely two edges, and the islanding node is a node not connected to any edge.

5. The method according to claim 1, further comprising:

determining, in the power supply tree graph, a target node corresponding to the target device and a standby edge corresponding to the standby power supply, and determining the common parent node shared by the target node and the standby edge; and determining not to perform overload detection on each device corresponding to a node or an edge that is not on a path connecting the common parent node and the edge corresponding to the standby power supply; and for each of the target subsets, determining not to perform overload detection on each device corresponding to a node or an edge in said target subset in response to there being no two nodes in said target subset between which the parent-child relationship is changed due to the load transfer;

determining not to perform overload detection on each device corresponding to a node or an edge in said target subset in response to that the node or the edge is neither on the path connecting the common parent node and a parent node of the two nodes between which a parent-child relationship is generated from nonexistence due to the load transfer, nor on the path connecting the nodes between which the parent-child relationship is reversed due to the load transfer.

6. The method according to claim 1, wherein the overload detection is performed through power superposition.

7. The method according to claim 6, wherein the power superposition comprises:

calculating a net output power or net input power of a device corresponding to a node in the power supply tree graph along a power flow direction, and comparing the net output power or net input power with a rated transmission power of the device to determine whether the device is overloaded; and calculating a sum of loads superposed on a device corresponding to an edge in the power supply tree graph along the power flow direction, and comparing the sum with a tolerant capacity of the device to determine whether the device is overloaded.

8. The method according to claim 7, wherein each node in the power supply tree graph represents a device which is not capable of being switched between on and off in the power system.

9. The method according to claim 7, wherein each edge in the power supply tree graph represents a device which is capable of being switched between on and off in the power system.

10. The method according to claim 1, further comprising: determining an order of all transfer schemes in which devices are not overloaded due to the load transfer, based on an actual load rate of the devices after the load transfer.

* * * * *